(12) United States Patent
Tran

(10) Patent No.: US 9,645,874 B2
(45) Date of Patent: May 9, 2017

(54) ANALYZING OPENMANAGE INTEGRATION FOR TROUBLESHOOTING LOG TO DETERMINE ROOT CAUSE

(71) Applicant: Dell Products L.P., Round Rock, TX (US)

(72) Inventor: Trung M. Tran, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 14/596,513

(22) Filed: Jan. 14, 2015

(65) Prior Publication Data
US 2016/0203035 A1 Jul. 14, 2016

(51) Int. Cl.
G06F 11/07 (2006.01)

(52) U.S. Cl.
CPC ........ G06F 11/079 (2013.01); G06F 11/0709 (2013.01); G06F 11/0751 (2013.01); G06F 11/0778 (2013.01)

(58) Field of Classification Search
USPC ........................................................ 714/26
See application file for complete search history.

(56) References Cited

U.S. PATENT DOCUMENTS

| 4,757,463 | A * | 7/1988 | Ballou | F02P 17/00 701/114 |
|---|---|---|---|---|
| 6,836,894 | B1 * | 12/2004 | Hellerstein | G06F 11/323 345/619 |
| 6,950,865 | B1 * | 9/2005 | Depaolantonio | H04L 43/065 709/223 |
| 7,822,848 | B2 * | 10/2010 | Muller | G06F 9/4443 709/201 |
| 8,995,670 | B2 * | 3/2015 | Lambert | G10L 25/48 381/56 |
| 2005/0289404 | A1 * | 12/2005 | Maguire | G06F 11/0748 714/57 |
| 2011/0078293 | A1 * | 3/2011 | Phung | G06F 9/44505 709/222 |
| 2011/0231697 | A1 * | 9/2011 | Berke | G06F 11/004 714/3 |
| 2012/0198349 | A1 * | 8/2012 | Chandrasekhar | G06F 3/048 715/740 |
| 2013/0346917 | A1 * | 12/2013 | Bragdon | G06F 11/3419 715/802 |
| 2014/0245296 | A1 * | 8/2014 | Sethuramalingam | G06F 9/45533 718/1 |
| 2015/0019759 | A1 * | 1/2015 | Tran | H04L 41/0886 709/245 |
| 2015/0156212 | A1 * | 6/2015 | Khatri | H04L 63/1425 726/23 |
| 2016/0065620 | A1 * | 3/2016 | Liu | H04L 63/20 726/1 |
| 2016/0179704 | A1 * | 6/2016 | Berke | G06F 12/1441 711/163 |
| 2016/0203159 | A1 * | 7/2016 | Tran | G06F 17/30174 707/620 |

* cited by examiner

Primary Examiner — Kamini Patel
(74) Attorney, Agent, or Firm — Terrile, Cannatti, Chambers & Holland, LLP; Stephen A. Terrile

(57) ABSTRACT

A system, method, and computer-readable medium for enhancing troubleshoot log analysis. More specifically, in certain embodiments, a management suite error log analysis system enables users, including engineers and technical support personnel to quickly and effectively determine a root cause of an error and to suggest possible solutions to the error.

12 Claims, 12 Drawing Sheets

```
!/perl/bin/perl -s use strict;

my $find = "error";

my $log = $ARGV[0];

open FILE, $log
        or die ("Can't open FILE: $!\n");

my @line = <FILE>;

for (@line) {if ( $_ =~ /$find/ ) {print "$_\n";}
}
close FILE or die "$!\n";
```

*Figure 4*

```perl
!/perl/bin/perl -s use strict;
use warnings;
use IO::Uncompress::Unzip qw(unzip $UnzipError);

# Spectre Bundle TroubleShoot
my $zipfile = 'DVCPLog.zip';

# text to search passed as the first argument
my $find = $ARGV[0];

my $u = new IO::Uncompress::Unzip $zipfile
    or die "Cannot open $zipfile: $UnzipError";

die "Zipfile has no members"
    if ! defined $u->getHeaderInfo;

for (my $status = 1; $status > 0; $status = $u->nextStream) {
    my $name = $u->getHeaderInfo->{Name};
    warn "Processing member $name\n" ;

if ($name =~ /\/$/) {
        mkdir $name;
    }
    else {
            unzip $zipfile => $name, Name => $name
        or die "unzip failed: $UnzipError\n";

open FILE, $name;
                #or die("Can't open $name: $!\n");
            my @line = <FILE>;
            for (@line) {
                if ($_ =~ /$find/) {
                    print "$_\n";
                }
            }
            close FILE;
    }
}
```

*Figure 5*

```perl
#!/usr/bin/perl
Search Oracle KB for PSQN solution use strict;
use warnings;
use 5.012;

# Searching string
my $search = $ARGV[0];

# The OKB command line used to search for the KB database that matches searching string
my $OKB = "to be filled later";

# Output File to store the KB articles which contain two columns:
# KCS/PSQN number and Description
my $outfile = 'solution.txt';

my $kcs = "KCS no";
my $title = Title";

open my $ofh, '>', $file
        or die "Could not open '$file' $!\n";

# Print the Header
printf $ofh ("%-15s %-15s\n", $kcs, $title);

Get the real values for kcs and title from OKB database $kcs = getKCS();
$$title = getTitle();

printf $ofh ("%-15s %-15s\n", $kcs, $title);

close $ofh;
```

*Figure 6*

```
For each pre-defined testcripts from 1 to n
  Execute script i
  Check the Return Code
  If it is equal 0 then
    continue
  else
    Analyze the failing script
    Is it invalid Credential
      if it is then
        Issue the Invalid Credential Root cause and terminate Is it Network Issue by failing ping command
      if it is then
        Issue the Network Root cause and terminate Is it Network Issue by failing ping command
      if it is then
        Issue the Network Root cause and terminate Is it iDRAC Issue by failing obtaining the iDRAC IP via winrm command
      if it is then
        Issue the iDRAC Root cause and terminate Is it LC Issue by failing to execute the winrm command
      if it is then
        Issue the LC Root cause and terminate Is it 11G System and OMSA Issue by failing the winrm command
      if it is then
        Issue the OMSA Root cause and terminate Is it unsupported Hypervisor OS defined from the OS supported list
      if it is then
        Issue the unsupported Hypervisor OS  Root cause and terminate Is it unsupported Server Generation defined from the Generation supported list
      if it is then
        Issue the unsupported Generation and terminate
```

*Figure 7A*

```
Is it for Firmware Update task
    Is ports 2049, 4001, 4002, 4003, 4004 are open
    if it is NOT then
        Issue the Port is NOT open Root cause and terminate
    Is Appliance could access the ftp.dell.com web site ok?
    if it is NOT then
        Issue the dell support Web site Root cause and terminate
    Is Appliance could communicate with iDRAC and iDRAC could access the
Appliance's directory, /nfsstage/repository, ok?
    if it is NOT then
        Issue the iDRAC communication Root cause and terminate
            Is package is downloaded and placed under the /nfsstage/repository directory
ok?
    if it is NOT then
        Issue the iDRAC download Root cause and terminate
    Is package is on iDRAC queue waiting for other jobs to be finished?
    if it is then
        Issue the iDRAC queue Root cause and terminate Is it for Deployment task
    if it is then
        Is ports 2049, 4001, 4002, 4003, 4004 are open
        if it is NOT then
            Issue the Port is NOT open Root cause and terminate
        Is Hypervisor OS supported
        if it is NOT then
            Issue the Hypervisor OS Root cause and terminate
        Is Host Generation supported
        if it is NOT then
            Issue the Host Generation Root cause and terminate
        Is it Connection timed out
        if it is then
            Issue the Connection timed out Root cause and terminate
        Is it OS failure after deployment
        If it is then
            Issue the Post Deployment Root cause and terminate Is it for Connection Profile Test
        if it is then
```

*Figure 7B*

```perl
!/perl/bin/perl -s use strict;
use Switch;

require("DetermineRootCause.pl");

switch(RC) {
  case SPECTRE_RC_OK { }
  case SPECTRE_RC_INVALID_IDRAC_CREDENTIAL     {print "Please provide the
correct iDRAC Credential"}
  case SPECTRE_RC_INVALID_HOST_CREDENTIAL      {print "Please provide the
correct Host Credential"}
  case SPECTRE_RC_INVALID_AD_CREDENTIAL        {print "Please provide the
correct AD Credential"}
  case SPECTRE_RC_CONNECTION_TIMED_OUT         {print "Please use
timeout=<new value> to inccraete the timed out value"}
  case SPECTRE_RC_UNSUPPORTED_OS               {print "Please use the
supported Hypervisor OS defined from the Release Notes"}
  case SPECTRE_RC_UNSUPPORTED OS_VERSION       {print "Please use the
supported Hypervisor version defined from the Release Notes"}
  case SPECTRE_RC_UNSUPPORTED_GENERATION       {print "Please use the
supported Host Generation defined from the Release Notes"}
  case SPECTRE_RC_UNSUPPORTED_OMSA             {print "Please use
the supported OMSA version defined from the Release Notes"}
  case SPECTRE_RC_NFS_PORT_NOT_OPENED          {print "Please open ports
2049 and 4001-4004"}
  case SPECTRE_RC_SNMP_PORT_NOT_OPENED         {print "Please open ports
161, 162, 11620"}
```

*Figure 8A*

```
    case SPECTRE_RC_IDRAC_NOT_RESPONDED          {print "Please reset
iDRAC"}
    case SPECTRE_RC_LC_NOT_RESPONDED                      {print "Please
reboot the host"}
    case SPECTRE_RC_FW_VERSION_NOT-SUPPORTED   {print "Please select the
supported FW version defined from the Release Notes"}
    case SPECTRE_RC_RAID_NOT_SUPPORTED          {print "Please use the
supported RAID Level"}
    case SPECTRE_RC_NO_PDD                     {print "This operation
requires to have a Physical Disk"}
    case SPECTRE_RC_NO_SD                                  {print "This
operation requires to have a Scan Disk"}
    case SPECTRE_RC_UNSUPPORTED_UEFI           {print "Please use BIOS
mode instead of UEFI Mode"}
    case SPECTRE_RC_WRONG_GENERATION                       {print "This
operation is not applicable for this host generation"}
    case SPECTRE_RC_SUPPORT_SITE_INACCESSIBLE   {print "Please contact
Dell Suport to inform the Dell Support Site currently is not accessible"}
    case SPECTRE_RC_COULD_NOT_DOWNLOAD_PKG     {print "Please check /
nfsstage/repository directory to see why package could not be downloaded"}
    case SPECTRE_RC_JOBS_WAITING_ON_QUEUE       {print "Please use winrm
command to iDRAC Web Console to clear all iDRAC jobs on queue"}
    else                                                {print "Contact
Dell Support"}
}
```

*Figure 8B*

| Task | iDRAC | OMSA | NFS | CIFS | DB | Repository | Boot Order | Ver | Zip | Depo | vCenter |
|---|---|---|---|---|---|---|---|---|---|---|---|
| Version | | | | | | | | x | | | |
| Connection | x | x | | | | | | | | | |
| Deployment | | | x | | | | x | | | | |
| Compliance | x | x | | | | | | | | | |
| FW Update | | | | | | x | | | | | |
| Registration | | | | | | | | | | | x |
| RPM Update | | | | | | | | | | x | |
| Backup/Restore | | | | | | | | | x | | |
| License | x | | | | | | | | | | x |
| Certification | | | | | | | | | | | x |
| Web Client | | | | | | | | | | | x |
| Desktop Client | | | | | | | | | | | x |
| Bundle Log | | | | | | | | | x | | |

*Figure 9*

ANALYZING OPENMANAGE INTEGRATION FOR TROUBLESHOOTING LOG TO DETERMINE ROOT CAUSE

BACKGROUND OF THE INVENTION

Field of the Invention

The present invention relates to information handling systems. More specifically, embodiments of the invention relate to analyzing a troubleshooting log to determine a root cause of an issue.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a server, which is typically dedicated to running one or more services as a host on a network. The advent of cloud computing in recent years has made the use of servers increasingly common. As a result, it is not unusual for hundreds, if not thousands, of servers to be deployed in a given data center. Historically, servers were locally managed by an administrator through a shared keyboard, video display, and mouse (KVM). Over time, remote management capabilities evolved to allow administrators to monitor, manage, update and deploy servers over a network connection.

One example of these capabilities is the use of a remote access controller (RAC), which is operably coupled to, or embedded within, the server and remotely accessed by an administrator via an out-of-band communication link. As an example, the Integrated Dell Remote Access Controller (iDRAC) from Dell, Inc. has its own processor, memory, network connection, and access to the system bus. Integrated into the motherboard of a server, it provides out-of-band management facilities that allow administrators to deploy, monitor, manage, configure, update, troubleshoot and remediate the server from any location, and without the use of agents. It is known to provide remote access controllers with a management application suite which enhance certain system management functionality of the remote access controller. For example, OpenManage Integration (OMI) for VMware vCenter (also referred to as Spectre) is a highly complex management application suite for System Management, which are integrated with a remote access controller such as the iDRAC, LifeCycle Controller (LC), OpenManage Server Administrator (OMSA), VMware vSphere Client, and Web Client.

The use of a RAC for remote management of a server in a data center can be advantageous. However, it can also present challenges. For example, once an issue is raised by the RAC, the issue often has too many possible points involved for determining the root cause. Currently, known management application suites such as OMI only provide users a method for collecting a Bundle Troubleshoot Log which is provided as a large zip file. However, this zip file contains many large log files (see the DVCPLog.png) including Application Logs, Third Party Logs, and others. Being able to trouble shoot an issue in this environment using the trouble shoot log is often difficult and time consuming.

Known analysis of the Bundle Troubleshoot Log is performed manually by IT support such as manufacturer support teams, International Product Support (IPS), as well as Developer support teams. Accordingly, it would be desirable to provide more efficient support for issue analysis, knowledge base (KB) searching, and solution suggestion.

SUMMARY OF THE INVENTION

A system, method, and computer-readable medium are disclosed for enhancing troubleshoot log analysis. More specifically, in certain embodiments, a management suite error log analysis system enables users, including engineers and technical support personnel to quickly and effectively determine a root cause of an error and to suggest possible solutions to the error.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows an example of a SepctreErrors.pl Perl script.

FIG. 5 shows an example of a SpectreAnalysis.pl Perl script.

FIG. 6 shows an example of a SearchKB.pl Perl script.

FIGS. 7A and 7B show an example of a DetermineRootCause pseudo code.

FIGS. 8A and 8B show an example of a Solution.pl Perl script.

FIG. 9 shows an example of an Error Analysis Table.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
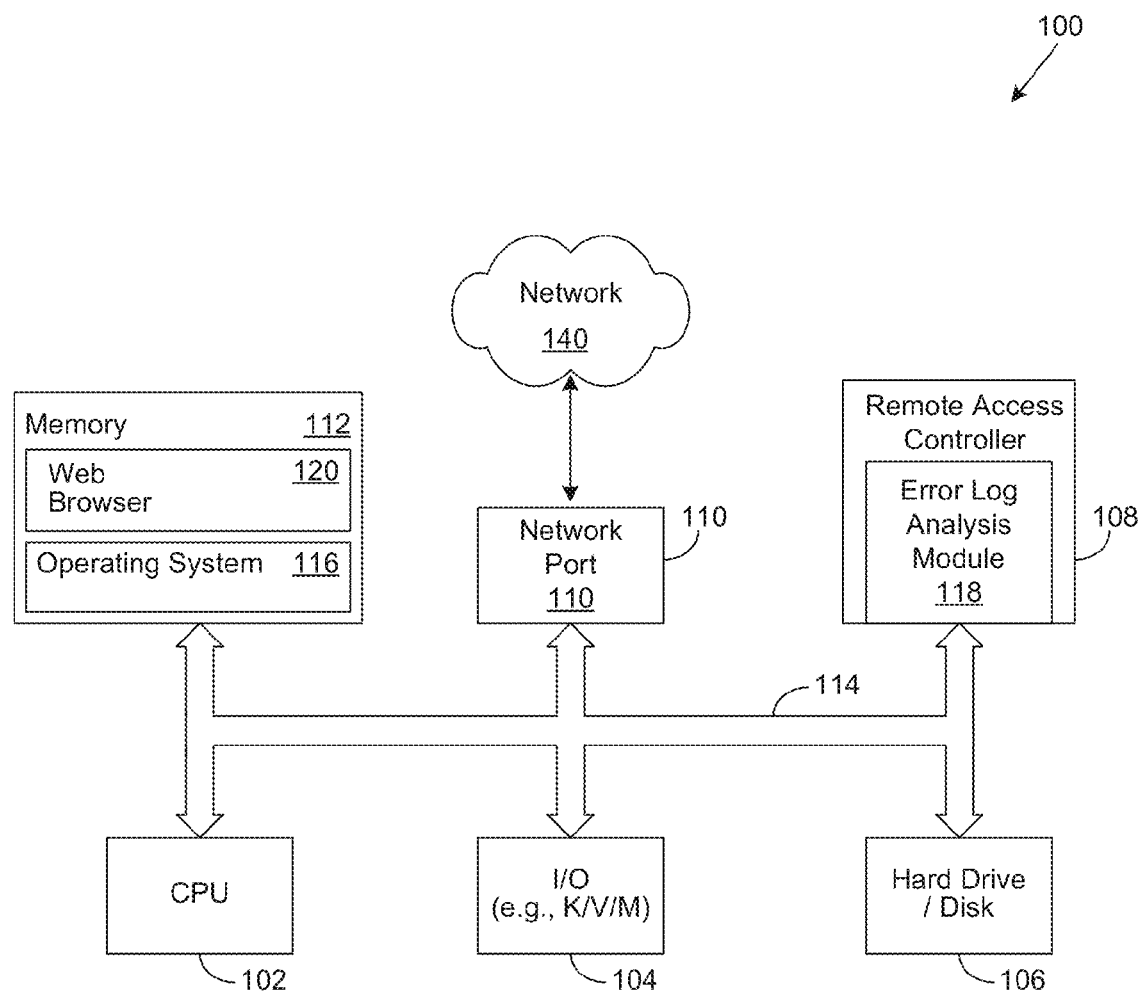
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems, such as a remote access controller (RAC) 108. In various embodiments, the RAC 108 includes a management suite error log analysis module 118. In one embodiment, the management suite error log analysis module 118 is operatively coupled to the RAC 108. In one embodiment, the management suite error log analysis module 118 is embedded in the RAC 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a web browser 120.

Figure 2:
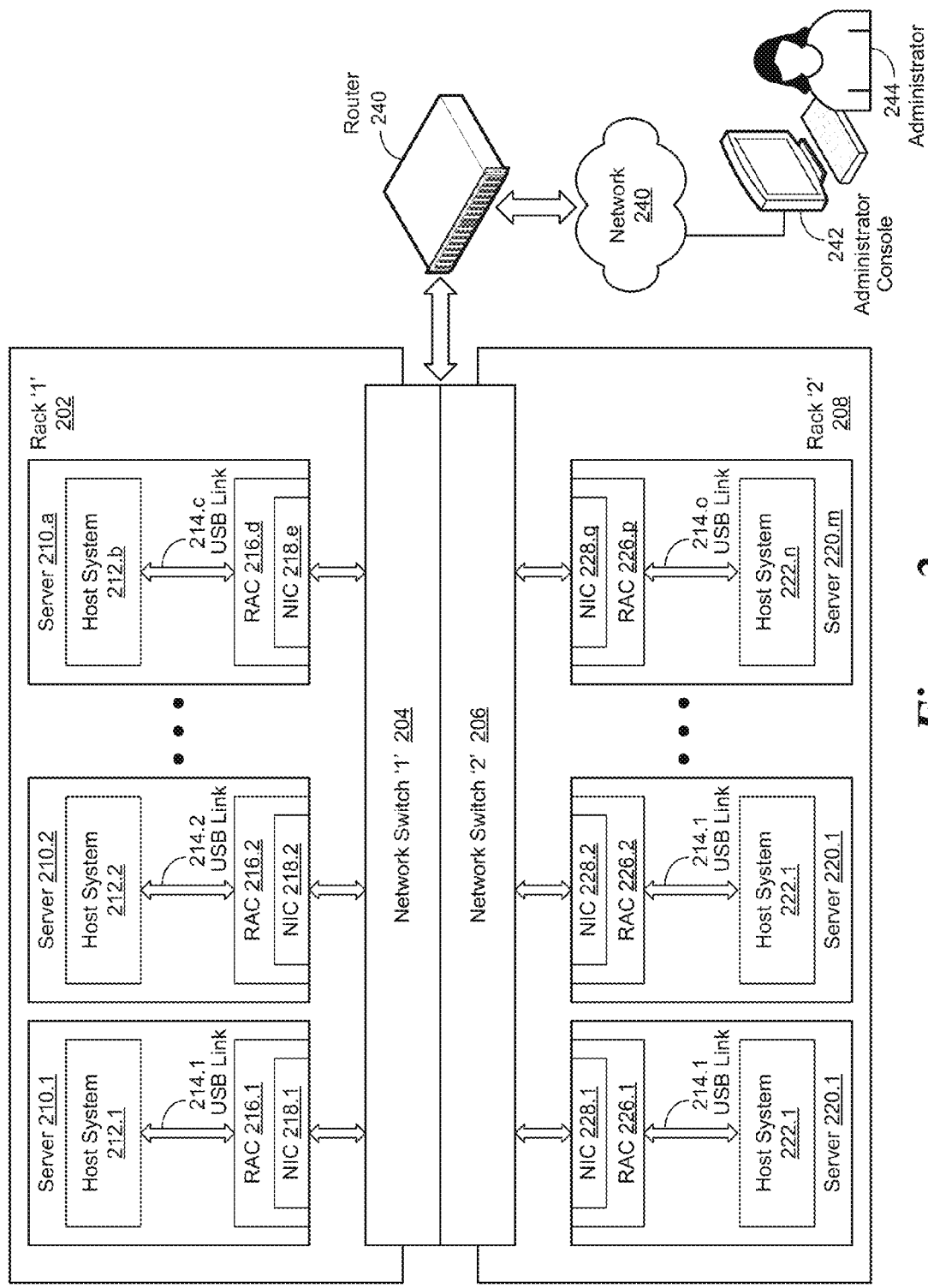
FIG. 2 is a simplified block diagram of a plurality of remote access controllers (RACs) implemented with a corresponding plurality of servers.

FIG. 2 is a simplified block diagram of a plurality of remote access controllers (RACs) implemented with a corresponding plurality of servers in accordance with an embodiment of the invention. FIG. 2 illustrates one example of an integration environment in which the present invention operates.

As shown in FIG. 2, server rack '1' 202 includes a network switch '1' 204 and servers 210.1 and 210.2 through 210.a, where 'a' is an integer index greater than or equal to 2. In one embodiment, the servers 210.1 and 210.2 through 210.a respectively include a host system 212.1 and 212.2 through 212.b and a RACs 216.12 and 216.2 through 216.d, where 'b' and 'd' are integer indexes greater than or equal to 2. In one embodiment, the host systems 212.1 and 212.2 through 212.b are respectively coupled to the RACs 216.1 and 216.2 through 216.d via Universal Serial Bus (USB) links 214.1 and 214.2 through 214.c, where 'c' is an integer index greater than or equal to 2. In one embodiment, the RACs 216.1 and 216.2 through 216.d are respectively embedded in the servers 210.1 and 210.2 through 210.a. In one embodiment, the RACs 216.1 and 216.2 through 216.d respectively include a Network Interface Controller (NIC) 218.1 and 218.2 through 218.e, where 'e' is an integer index greater than or equal to 2. In one embodiment, the NICs 218.1 and 218.2 through 218.e are used to respectively couple the RACs 216.1 and 216.2 through 216.d to the network switch 'a' 204.

Server rack '2' 208 likewise includes a network switch '2' 206 and servers 220.1 and 220.2 through 220.m, where 'm' is an integer index greater than or equal to 2. In one embodiment, the servers 220.1 and 220.2 through 220.m respectively include a host system 222.1 and 222.2 through 222.n and RACs 226.1 and 226.2 through 226.p, where 'n' and 'p' are integer indexes greater than or equal to 2. In one embodiment, the host systems 222.1 and 222.2 through 222.b are respectively coupled to the RACs 226.1 and 226.2 through 226.p via USB links 224.1 and 224.2 through 224.o, where 'o' is an integer index greater than or equal to 2. In one embodiment, the RACs 226.1 and 226.2 through 226.p are respectively embedded in the servers 220.1 and 220.2 through 220.m. In one embodiment, the RACs 226.1 and 226.2 through 226.p respectively include a NIC 228.1 and 228.2 through 228.q, where 'q' is an integer index greater than or equal to 2. In one embodiment, the NICs 228.1 and 228.2 through 228.q are used to respectively couple the RACs 226.1 and 226.2 through 226.p to the network switch 'b' 206.

In one embodiment, network switch '1' 201 and network switch '2' 206 are communicatively coupled to respectively exchange data between servers 210.1 and 210.2 through 210.a and servers 220.1 and 220.2 through 220.m. In one embodiment, the network switches '1' 204 and '2' 206 are communicatively coupled via router to a link-local network 240. In one embodiment, the link-local network 240 is also communicatively coupled to an administrator console 242, which is used by an administrator 244 to administer RACs 216.1 and 216.2 through 216.d and RACs 226.1 and 226.2 through 226.p. In one embodiment, each of the RACs 216.1 and 216.2 through 216.d and RACs 226.1 and 226.2 through 226.p are assigned a unique link-local Internet Protocol (IP) address by the administrator 244.

As used herein, a link-local network refers to a private network that uses a private IP address space. These addresses are commonly used enterprise local area networks (LANs) when globally routable addresses are either not mandatory, or are not available for the intended network applications. These addresses are characterized as private because they are not globally delegated and IP packets addressed by them cannot be transmitted onto the public Internet. As the name implies, a link-local network uses link-local addresses, which refers to an IP address that is intended only for communications within a segment, or link, of a local network, or to establish a point-to-point network connection to a host.

Routers, such as router 240, do not forward packets with link-local IP addresses. Link-local IP addresses may be assigned manually by an administrator or by operating system procedures. They may also be assigned using stateless address autoconfiguration. In IPv4, their normal use is typically restricted to the assignment of IP addresses to network interfaces when no external, stateful mechanism of address configuration exists, such as the Dynamic Host Configuration Protocol (DHCP), or when another primary configuration method has failed. In IPv6, link-local addresses are generally utilized for the internal functioning of various protocol components.

Figure 3:
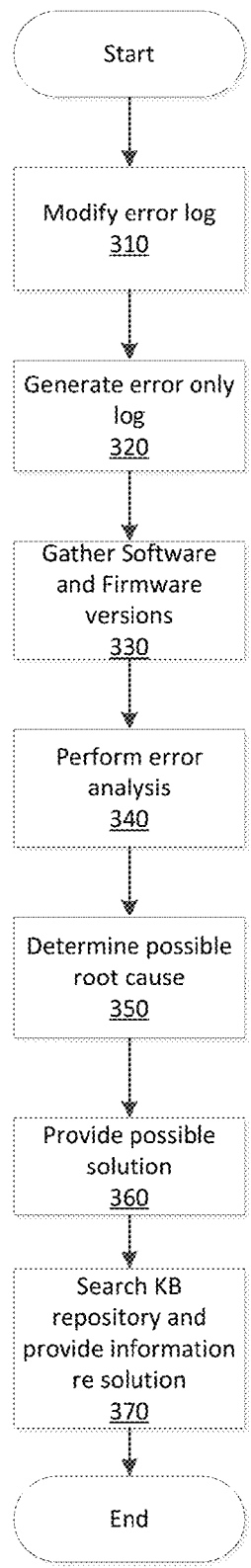
FIG. 3 shows a flow chart of the operation of a management suite error log analysis system.

Referring to FIG. 3, the operation of a management suite error log analysis system 300 is shown. In certain embodiments, the management suite error log analysis system 300 corresponds to the management suite error log analysis module 118.

More specifically the management suite error log analysis system 300 begins operation by modifying an error log at step 310. In certain embodiments, the error log comprises a management suite error log such as a Bundle Troubleshoot Log which includes a plurality of error codes (such as Spectre codes) where the Bundle Troubleshoot log is modified to include a Hierarchical StackTrace along with error messages. In certain embodiments, this modified Bundle Troubleshoot Log is stored as Spectre_vCenter_App.log. One example of an entry within the modified Bundle Troubleshoot Log may be:

```
DEBUG | 2008-09-06 10:54:40,473 |
ValidateCredential.java:validate(459) -Invalid Password used
MainFrame.java:main
   →Inventory.java:runnow
     →ConnectionProfle.java:Connect
       →ValidateCredential.java:validate
```

Where each indented line represents a calling application program interface (API) from each file. For example, runnow is the method called and defined within the Inventory.java file Next, at step 320, an error only log is generated by the management suite error log analysis system 300. In certain embodiments, in addition to the specific error only log file, all the errors may also be written to a backend error log file and a user interface (UI) log file. In certain embodiments, the management suite error log analysis system 300 modifies the codes for the OpenManage Integration for VMware vCenter to provide the backend log file SpectreError.log, which is used by the management suite error log analysis system 300 as a backend log, and the user interface log file SpectreUIError.log, which is used by a user interface (UI) of the management suite error log analysis system 300. When the codes for the OpenManage Integration for VMware vCenter are modified, both the backend log and the user interface log contain only the Error Messages. In certain embodiments, the management suite error log analysis system 300 executes an error only application (e.g., see the SepctreErrors.pl Perl script shown in FIG. 4) to generate the Error Messages to a file.

Next, at step 330, the management suite error log analysis system 300 gathers the software and firmware versions for all components (e.g., for all hosts/servers and blades) contained within the integration environment. In certain embodiments, this information is gathered by modifying the management suite codes of each component of the integration environment. The software version codes can include the software version for any appliances within the integration environment. The firmware version codes can include codes for remote access controllers (e.g., iDRAC, LC, OMSA and basic input output system (BIOS) for each host/server and/or blade contained within the integration environment.

Next, at step 340, management suite error log analysis system 300 performs an error analysis operation. In certain embodiments, the error analysis operation is performed by executing an error analysis tool (e.g., the SpectreAnalysis.pl perl script shown in FIG. 5). In certain embodiments the error analysis operation includes one or more of the following:

generate an Error Analysis Table;
  perform a search of a log, such as the error only log, using logical operations such as a logical AND operation or a logical OR operation (e.g., "error AND deployment" or "R610 or R820");
  provide an output of a Complete Analysis run (in certain embodiments the Complete Analysis includes an Analysis, a Summary, and a Solution); and,
  perform a search of a knowledge base database to identify a possible work around solution written from Knowledge Centered Support (KCS) and Product Support Quick Note (PSQN) (e.g., see the SearchKB.pl Perl script shown in FIG. 6).

Next, at step 350, the management suite error log analysis system 300 reviews the Error Analysis Table to determine a possible root cause for the error (e.g., see the DetermineRootCause pseudo code shown in FIGS. 7A and 7B). Next at step 360, the management suite error log analysis system 300 accesses error resolution guidelines to provide a possible solution (e.g., see the Solution.pl Perl script shown in FIGS. 8A and 8B). Next, at step 370, the management suite error log analysis system 300 searches a Knowledge Based Article repository to suggest the written Knowledge Centered Support (KCS) or Product Support Quick Note (PSQN) or solution (SLN) (e.g., see the SearchKB.pl Perl script shown in FIG. 6).

Referring to FIG. 9, an example of an Error Analysis Table 400 is shown. The Error Analysis Table is generated by the error analysis tool based upon analysis of the error log. In the Error Analysis Table, the row indicates all functionality of task that is provided within a product. The column indicates a number of tests that need to be performed to be able to determine a root cause. For example, for the Connection test row, there are two columns marked with x. One of these columns indicates testing the communications between an Appliance and the iDRAC and the other column indicates testing the communication between the Appliance and the host.

Figure 10:
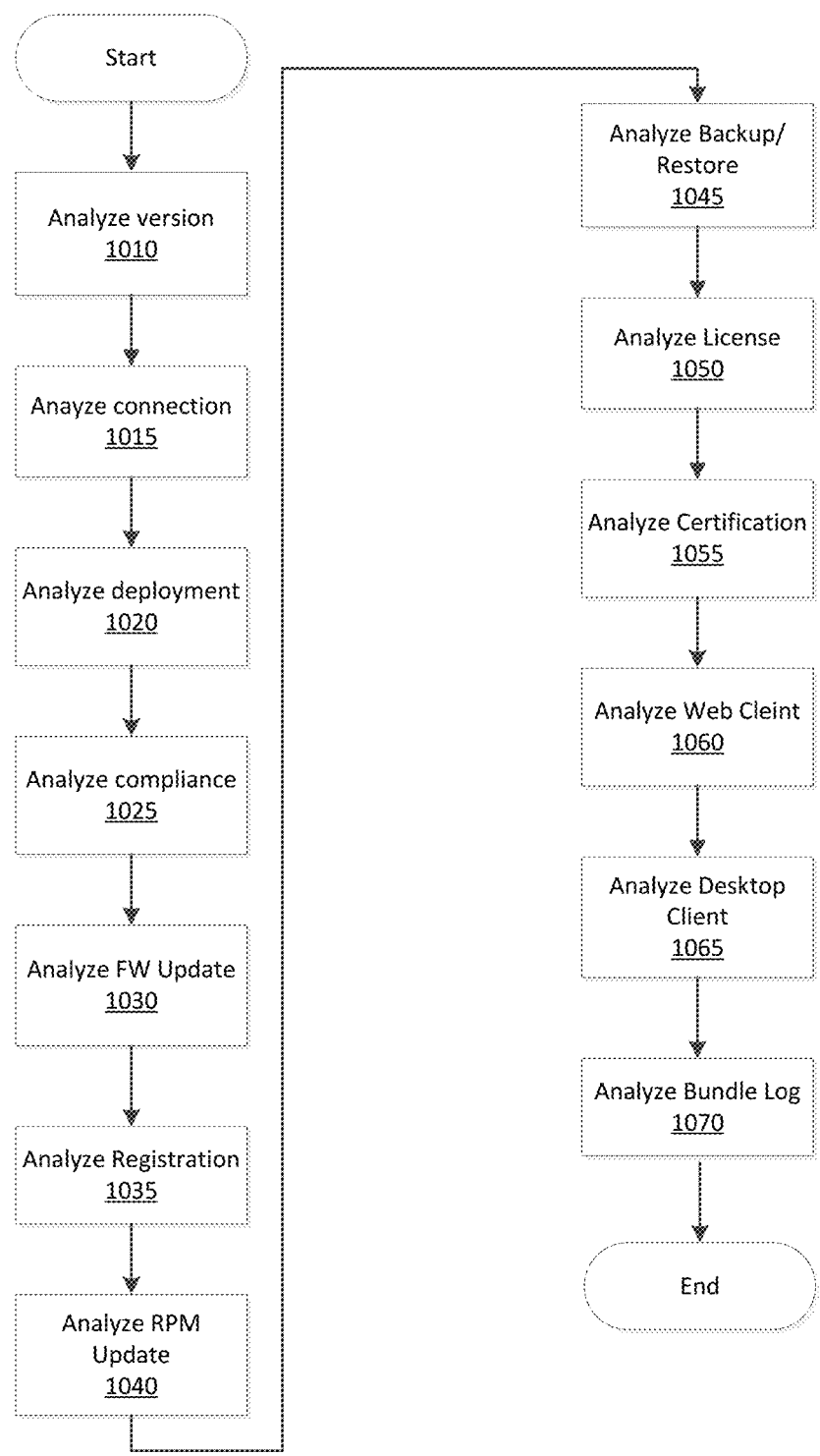
FIG. 10 shows a flow chart of the operation of an error analysis tool.

Referring to FIG. 10 a flow chart of the operation of an error analysis tool 1000 is shown. When the error analysis tool is executed at step 1010, the error analysis tool 1000 performs one or more of a plurality of error analysis operations. It will be appreciated that some or all of these error analysis operations may be performed sequentially in parallel or some combination of sequentially and in parallel.

The error analysis operations include an analyze version operation 1010, an analyze connection operation 1015, an analyze deployment operation 1020, an analyze compliance operation 1025; an analyze FW Update operation 1030; an analyze Registration operation 1035; an analyze an RPM Package Manager (RPM, where RPM is a core component of many Linux distributions) Update operation 1040; an analyze Backup/Restore operation 1045; an analyze License operation 1050; an analyze Certification operation 1055; an analyze Web Client operation 1060; an analyze Desktop Client operation 1065; and an analyze Bundle Log operation 1070.

When performing the analyze version operation, the error analysis tool performs one or more of the following steps:
  1. When performing the analyze Backup and Restore operation, the error Validate the Hypervisor OS against the Support Matrix defined in the Release Notes for each release
  2. Validate the Browser version against the Support matrix
  3. Validate the LC Version against the Support Matrix
  4. Validate the iDRAC version against the Support Matrix
  5. Validate the OMSA version against the support matrix
  6. Validate the VMware version against the Support Matrix When performing the analyze connection operation, the error analysis tool performs one or more of the following steps:
  1. Validate the provided iDRAC Credential is valid
  2. Validate the provided Host Credential is valid 3. Use ping command to test the communication from Appliance to iDRAC and vice versa
4. Use winrm IPProtocolEndPoint command to get iDRAC IP
5. Use winrm command to see if the specified credential are valid When performing the analyze deployment operation, the error analysis tool performs one or more of the following steps:
1. Check the NFS or CIFS mount point where the installing packages are residing
2. Validate the target ISO is supportable
3. Validate the provided iDRAC Credential is valid
4. Use winrm IPProtocolEndPoint command to obtain iDRAC IP
5. Validate the Boot Order
6. Validate to see the OS is up and running after deployed When performing the analyze compliance operation, the error analysis tool performs one or more of the following steps:
1. Validate iDRAC credential is valid
2. Validate iDRAC could communicate with Appliance
3. Validate OMSA can be logged on with provided credential
4. Validate iDRAC version before and after the compliance fix
5. Validate OMSA version before and after the compliance fix When performing the analyze FW Update operation, the error analysis tool performs one or more of the following steps:
1. Validate the provided iDRAC Credential is valid
2. Validate the iDRAC could mount to the /nfsstage/ repository directory of the Appliance or the designated directory where the upgrade packaged will be temporary placed
3. Use winrm SoftwareIdentity to obtain the list of Firmware to be installed
4. Validate the Host Generation i.e. 11G or 12G
5. Validate the package(s) selected to be upgraded are applicable for the target hosts/servers
6. Validate the target Firmware version before and after upgraded When performing the analyze Registration operation, the error analysis tool performs one or more of the following steps:
1. Validate the Admin role to be used to register the Appliance to the VMware vCenter Server Client
2. Validate the IP or hostname of the Appliance to be registered with vCenter Server
3. Validate the number of Appliances to the be registered with the same vCenter Server
4. Check if hostname or IP of the Appliance is registered. If it is hostname, it must have use the FQDN format When performing the analyze RPM Update operation, the error analysis tool performs one or more of the following steps:
1. Validate if the Repo URL is valid
2. Validate if the Repo URL is accessible form the Appliance
3. Validate the Appliance version before and after update analysis tool performs one or more of the following steps:
1. Validate if the Backup Directory exists and accessible
2. Validate the provided credential for Backup is valid
3. Validate the Backup GZ file is placed at the designated place
4. Validate the specified decrypted password for Restore is valid
5. Validate the Appliance's data and configuration are still the same after Restore When performing the analyze License operation, the error analysis tool performs one or more of the following steps:
1. Validate the License *.xml file is loadable into the Appliance
2. Validate the number of available and in use hosts are correct
3. Validate the License expiration date
4. Validate the Type of License (Trial, perpetual, limited)

When performing the analyze Certification operation, the error analysis tool performs one or more of the following steps:
1. Validate the specified PEM file has correct format
2. Validate the Certificate Authority (CA) is correct
3. Validate the Certificate Expiration date
4. Validate the Certificate is loadable into the Admin Portal When performing the analyze Web Client operation, the error analysis tool performs one or more of the following steps:
1. Validate the Web Client can be accessible from http://<vCenterIP>:9443/vsphere-client
2. Validate the Dell Management is created and accessible from VMware Web Client
3. Validate the Dell OpenManage Integration is registered and enabled
4. Validate the Dell OpenManage Integration icon is created and loadable
5. Validate panels, Tabs, and Links are working as expected When performing the analyze Desktop Client operation, the error analysis tool performs one or more of the following steps:
1. Validate the Admin Portal can be accessible from http://<ApplianceIP>
2. Validate the Dell Management Icon is created and accessible from VMware vSphere Client
3. Validate the Plug-in is registered, managed, and enabled from VMware vSphere Client
4. Validate all the provided panels, tabs, and links of the OpenManage Integration are working When performing the analyze Bundle Log operation, the error analysis tool performs one or more of the following steps:
1. Validate the Bundle Log is readable after downloaded
2. Validate the Bundle Log is downloaded to the specified path
3. Validate all the expected log are written to the zip file As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for determining a root cause of an error within an integration environment, comprising:
   providing the integration environment with a remote access controller, the remote access controller executing a management application suite, the management application suite comprising an OpenManage Integration for VMware vCenter;
   determining the root cause of the error via a management suite error log analysis module, the determining the root cause further comprising modifying an error log within the OpenManage Integration for VMware vCenter; and,
   suggesting possible solutions to the error via the management suite error log analysis module.

2. The method of claim 1, wherein:
   the error log comprises a management suite error log; and,
   the management suite error log is modified to include a Hierarchical Stack Trace along with error messages.

3. The method of claim 1, further comprising:
   generating an error analysis table based upon analysis of an error log of the integration environment; and wherein
   the determining the root cause of the error is based upon the error analysis table.

4. The method of claim 1, wherein:
   the determining a root cause of the error comprises performing an error analysis operation, the error analysis operation comprising at least one of an analyze version operation, an analyze connection operation, an analyze deployment operation, an analyze compliance operation; an analyze Firmware Update operation; an analyze Registration operation; an analyze RPM Update operation; an analyze Backup/Restore operation; an analyze License operation; an analyze Certification operation; an analyze Web Client operation; an analyze Desktop Client operation; and an analyze Bundle Log operation.

5. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   providing the integration environment with a remote access controller, the remote access controller executing a management application suite, the management application suite comprising an OpenManage Integration for VMware vCenter;
   determining the root cause of the error via a management suite error log analysis module, the determining the root cause further comprising modifying an error log within the OpenManage Integration for VMware vCenter; and,
suggesting possible solutions to the error via the management suite error log analysis module.

6. The system of claim 5, wherein:
the error log comprises a management suite error log; and,
the management suite error log is modified to include a Hierarchical Stack Trace along with error messages.

7. The system of claim 5, the computer program code further comprising instructions executable by the processor and configured for:
generating an error analysis table based upon analysis of an error log of the integration environment; and wherein
the determining the root cause of the error is based upon the error analysis table.

8. The system of claim 5, wherein:
the determining a root cause of the error comprises performing an error analysis operation, the error analysis operation comprising at least one of an analyze version operation, an analyze connection operation, an analyze deployment operation, an analyze compliance operation; an analyze Firmware Update operation; an analyze Registration operation; an analyze RPM Update operation; an analyze Backup/Restore operation; an analyze License operation; an analyze Certification operation; an analyze Web Client operation; an analyze Desktop Client operation; and an analyze Bundle Log operation.

9. A non-transitory, computer-readable storage medium embodying computer program code, the computer program code comprising computer executable instructions configured for:
providing the integration environment with a remote access controller, the remote access controller executing a management application suite, the management application suite comprising an OpenManage Integration for VMware vCenter;
determining the root cause of the error via a management suite error log analysis module, the determining the root cause further comprising modifying an error log within the OpenManage Integration for VMware vCenter; and,
suggesting possible solutions to the error via the management suite error log analysis module.

10. The non-transitory, computer-readable storage medium of claim 9, wherein:
the error log comprises a management suite error log; and,
the management suite error log is modified to include a Hierarchical Stack Trace along with error messages.

11. The non-transitory, computer-readable storage medium of claim 9, the computer program code further comprising computer executable instructions configured for:
generating an error analysis table based upon analysis of an error log of the integration environment; and wherein
the determining the root cause of the error is based upon the error analysis table.

12. The non-transitory, computer-readable storage medium of claim 9, wherein:
the determining a root cause of the error comprises performing an error analysis operation, the error analysis operation comprising at least one of an analyze version operation, an analyze connection operation, an analyze deployment operation, an analyze compliance operation; an analyze Firmware Update operation; an analyze Registration operation; an analyze RPM Update operation; an analyze Backup/Restore operation; an analyze License operation; an analyze Certification operation; an analyze Web Client operation; an analyze Desktop Client operation; and an analyze Bundle Log operation.

* * * * *